United States Patent
Bar-Menachem et al.

(10) Patent No.: US 10,284,601 B1
(45) Date of Patent: May 7, 2019

(54) MANAGING DEVIATIONS BETWEEN EXPECTED AND NORMAL OPERATIONS OF AUTHENTICATION SYSTEMS

(71) Applicant: EMC IP Holding Company LLC, Hopkiton, MA (US)

(72) Inventors: Ika Bar-Menachem, Herzelia (IL); Marcelo Blatt, Modiin (IL); Tomer Meidan, Ramat Gan (IL); Elad Koren, Tel Aviv (IL); Oded Peer, Raanana (IL); Shachar Israeli, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/597,393

(22) Filed: May 17, 2017

Related U.S. Application Data

(63) Continuation of application No. 14/230,551, filed on Mar. 31, 2014, now abandoned.

(51) Int. Cl.
*H04L 29/06* (2006.01)
*G06Q 20/40* (2012.01)

(52) U.S. Cl.
CPC .......... *H04L 63/20* (2013.01); *H04L 63/1433* (2013.01); *G06Q 20/4016* (2013.01)

(58) Field of Classification Search
CPC .. H04L 63/20; H04L 63/1433; G06Q 20/4016
See application file for complete search history.

(56) References Cited

U.S. PATENT DOCUMENTS

| | | | |
|---|---|---|---|
| 2010/0094767 A1* | 4/2010 | Miltonberger | G06Q 10/067 705/325 |
| 2014/0237545 A1* | 8/2014 | Mylavarapu | H04L 63/1433 726/3 |

OTHER PUBLICATIONS

"Kolmogorov-Smirnov test" (Jul. 25, 2013, Wikipedia, 7 pages, https://web.archive.org/web/20130725180858/http://en.wikipedia.org/wiki/Kolmogorov%E2%80%93mirnov_test#Test_with_estimated_parameters).*

* cited by examiner

*Primary Examiner* — Malcolm Cribbs
*Assistant Examiner* — Cheng-Feng Huang
(74) *Attorney, Agent, or Firm* — Krishnendu Gupta

(57) ABSTRACT

There are disclosed techniques for use in authentication. In one embodiment, the techniques comprise generating first and second distributions. The first distribution relating to risk scores expected to be produced by an authentication system in connection with requests to access a computerized resource. The expected risk scores are based on a normalization process configured to produce risk scores by normalizing raw risk scores in connection with requests. The second distribution relates to risk scores actually produced by the authentication system in connection with requests. The actual risk scores include risk scores normalized by the normalization process. The techniques also comprise comparing the first and second distributions by determining a Kolmogorov-Smirnov distance between the respective distributions. The techniques also comprise initiating, based on the comparison, a failover of the normalization process to a new normalization process for use by the authentication system.

18 Claims, 4 Drawing Sheets

MANAGING DEVIATIONS BETWEEN EXPECTED AND NORMAL OPERATIONS OF AUTHENTICATION SYSTEMS

RELATED APPLICATION

This application is a continuation of co-pending U.S. patent application Ser. No. 14/230,551, entitled "MANAGING DEVIATIONS BETWEEN EXPECTED AND NORMAL OPERATIONS OF AUTHENTICATION SYSTEMS", filed on Mar. 31, 2014, which is hereby incorporated herein by reference for all purposes.

FIELD OF THE INVENTION

The present invention relates generally to the field of authentication, and more specifically, to computer-implemented methods, apparatus, and computer program products for managing deviations between expected and normal operations of authentication systems.

BACKGROUND OF THE INVENTION

Adaptive authentication systems aim to identify fraudulent users even though such users possess credentials to gain access to account information of a legitimate user. For example, a fraudulent user may send login attempts at a time or location outside of those expected by a service provider. Existing adaptive authentication techniques compare information associated with a login attempt, such as time of the login and location from where the login originated, with a historical record of a typical user exhibiting expected login behavior such that the adaptive authentication system can determine whether or not to authenticate the login attempt.

An important component of any adaptive authentication system is the risk engine (RE) that generates a unique risk score that indicates the likelihood that an activity is fraudulent (e.g., the likelihood that an impersonator is performing a transaction using credentials of a real user). It should be understood that in some cases the risk engine can operate by first generating a 'preliminary' or a 'raw' risk score that is subsequently normalized in order to maintain a constant percentage of transactions in a score band. For example, the risk engine may generate a 'raw' risk score that is subsequently normalized to a scale (e.g., 0 to 1000). The higher the normalized risk score the more likely the transaction is fraudulent.

The above normalization approach is beneficial in that it allows the service provider to have an idea in advance of the amount of transactions that will get a final normalized risk score in a high risk band. Thus, the service provider can provide appropriate manpower in a call center that can deal with risky transactions by issuing further challenges. However, a significant difference between the expected amount of transactions in the high risk band and the actual amount of transactions in the high risk band can have a negative impact. For example, the risk engine may deploy a new model that may cause an increase in the amount of transactions receiving a score in a high risk band. Needless to say, this can cause serious problems for the service provider in the event of insufficient manpower in the call center.

SUMMARY OF THE INVENTION

There is disclosed a computer-implemented method, comprising: comparing a first distribution and a second distribution, wherein the first distribution relates to expected risk scores of an authentication system and the second distribution relates to actual risk scores of the authentication system; and based on the comparison and at least one policy, outputting an alert signifying a deviation between the expected operation and the actual operation of the authentication system.

There is also disclosed an apparatus, comprising: at least one processing device, said at least one processing device comprising a processor coupled to a memory; wherein the apparatus is configured to: compare a first distribution and a second distribution, wherein the first distribution relates to expected risk scores of an authentication system and the second distribution relates to actual risk scores of the authentication system; and based on the comparison and at least one policy, output an alert signifying a deviation between the expected operation and the actual operation of the authentication system.

There is further disclosed a computer program product having a non-transitory computer-readable medium storing instructions, the instructions, when carried out by one or more processors, causing the one or more processors to perform a method of: comparing a first distribution and a second distribution, wherein the first distribution relates to expected risk scores of an authentication system and the second distribution relates to actual risk scores of the authentication system; and based on the comparison and at least one policy, outputting an alert signifying a deviation between the expected operation and the actual operation of the authentication system.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
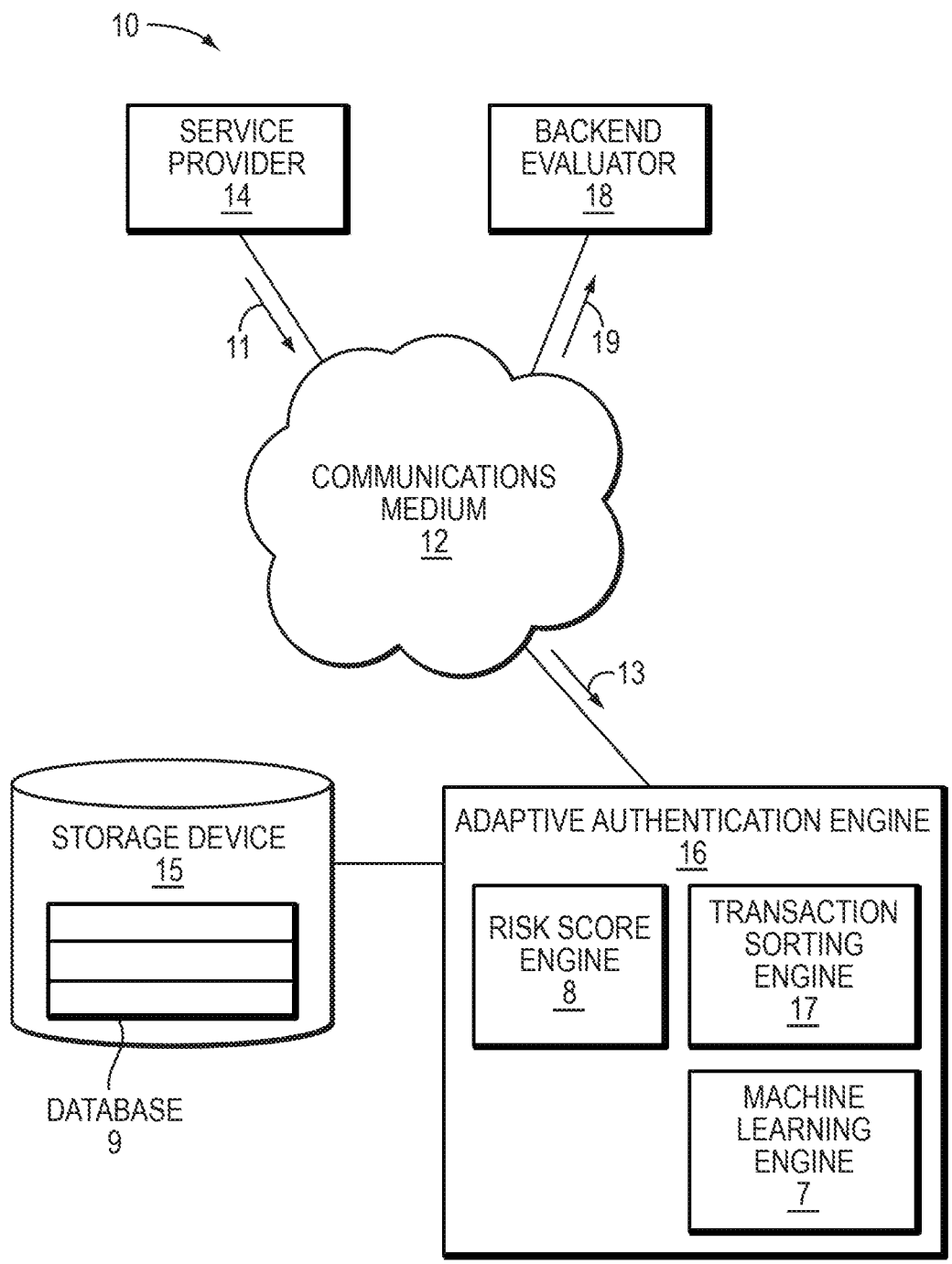
FIG. 1 is a schematic diagram illustrating an electronic environment in which the present invention can be implemented.

FIG. 1 illustrates an electronic environment 10 for carrying out the improved technique. Electronic environment 10 includes communications medium 12, service provider 14, adaptive authentication engine 16, storage device 15, and backend evaluator 18.

Communication medium 12 provides network connections between backend evaluator 18, service provider 14, and adaptive authentication engine 16. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

Service provider 14 is constructed and arranged to send transaction 11 to adaptive authentication engine 16 via communications medium 12.

Backend evaluator 18 is constructed and arranged to receive a set of risky transactions 19 from adaptive authentication engine 16. Backend evaluator 18 is also constructed and arranged to perform a backend evaluation on the risky transactions 19 in order to ascertain whether each transaction is fraudulent. Backend evaluator 19 is further constructed and arranged to send results 13 of backend evaluation to adaptive authentication engine 16.

Adaptive authentication engine 16 is constructed and arranged to receive transaction 11 from service provider 14 over communications medium 12. Adaptive authentication engine 16 is also constructed and arranged to access transaction data in database 9 stored on storage device 15. Adaptive authentication engine 16 is further constructed and arranged to receive results 13 of backend evaluation in order to update Bayesian weights used in risk score computation. Adaptive authentication engine 16 is further constructed and arranged to send the set of very risky transactions 19 to backend evaluator 18.

Figure 2:
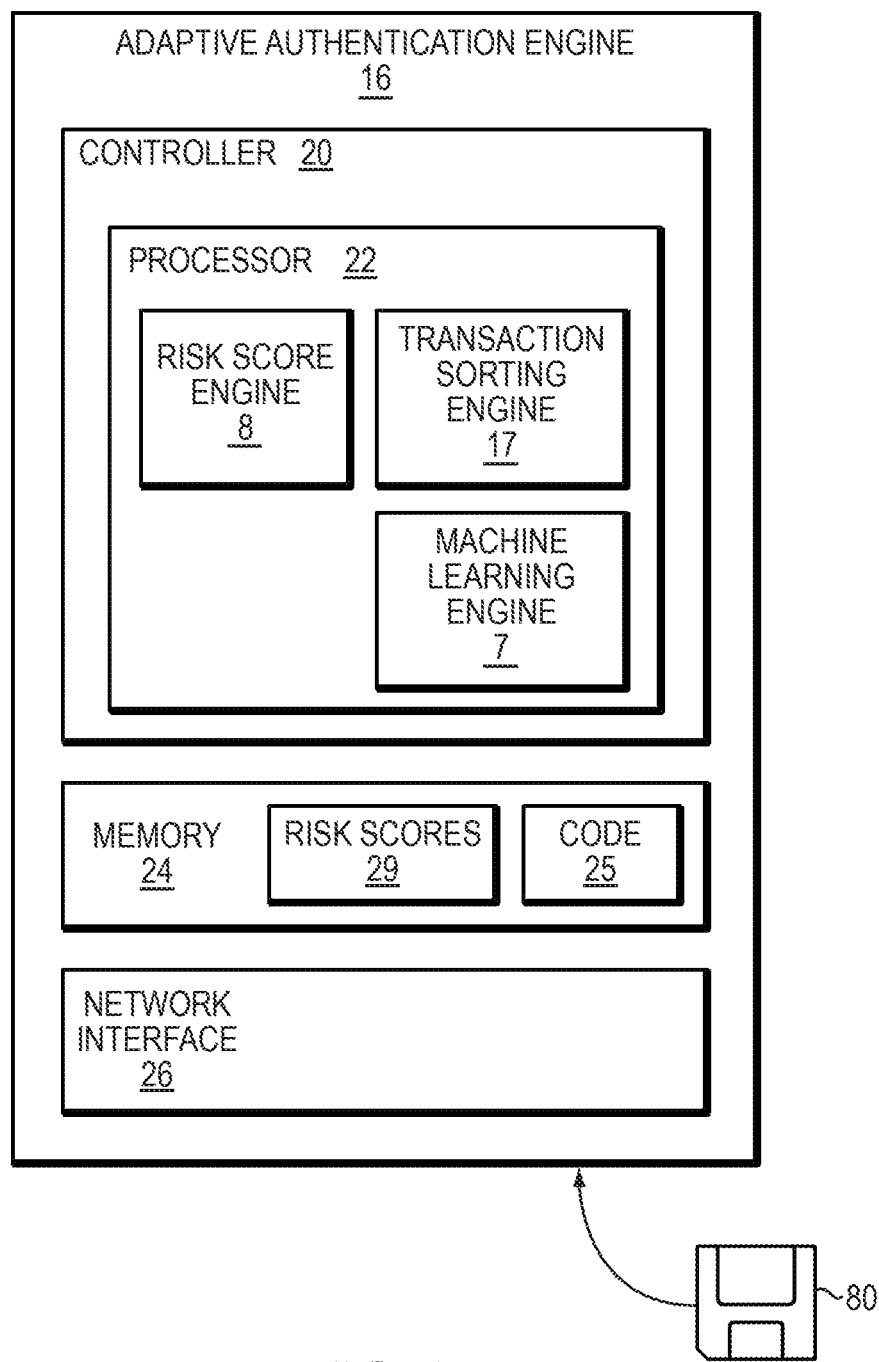
FIG. 2 is a schematic diagram illustrating the adaptive authentication engine within the electronic environment shown in FIG. 1.

Further details concerning adaptive authentication engine 16 are considered with respect to FIG. 2.

FIG. 2 illustrates components of adaptive authentication engine 16. The adaptive authentication engine 16 includes a controller 20 which in turn includes processor 22, a memory 24 and a network interface 26.

Memory 24 is configured to store code 25 which includes instructions to manage deviations between expected and normal operations of authentication systems. Memory 24 is further configured to store risk scores 29 (i.e., expected and actual risk scores). Memory 24 generally takes the form of, e.g., random access memory, flash memory or a non-volatile memory.

Processor 22 takes the form of, but is not limited to, Intel or AMD-based MPUs, and can include a single or multi-cores each running single or multiple threads. Processor 22 is coupled to memory 24 and is configured to execute the code 25 stored in memory 24. Processor 22 includes machine learning engine 7, risk score engine 8, and transaction sorting engine 17.

Machine learning engine 7 is constructed and arranged to receive results 13 of backend evaluation. Machine learning engine 7 is also constructed and arranged to store Bayesian weights in memory accessible to risk score engine 8 and adjust the Bayesian weights according to results 13 of backend evaluation.

Risk score engine 8 is constructed and arranged to assign a risk score to a transaction based on the Bayesian weights stored in memory. Risk score engine 8 is further constructed and arranged to store the assigned risk score for the transaction in memory accessible to transaction sorting engine 17.

Transaction sorting engine 17 is constructed and arranged to access the assigned risk score 29 for each transaction of a set of transactions under consideration from memory 24. Transaction sorting engine 17 is also constructed and arranged to rank transactions according to risk score, and send risky transactions having a risk score above a particular percentile threshold to backend evaluator 18.

Network interface 26 is constructed and arranged to send and receive data over communications medium 12. Network interface 26 is configured to receive transaction 11 from service provider 14 over communications medium 12 and in some cases to send a challenge to a user via service provider 14 (e.g., challenges in connection with risky transactions).

Network interface 26 is also configured to send transactions 19 to backend evaluator 18 and receive results 13. Also, network interface 26 is constructed and arranged to send and receive data from storage device 15.

Returning to FIG. 1, storage device 15 is constructed and arranged to store database 9 which contains previous transaction data. Storage device 15 is further constructed and arranged to receive requests to access transaction data from and send transaction data to adaptive authentication engine 16.

During operation, the service provider 14 sends the transaction 11 to the adaptive authentication engine 16. Upon receipt, the risk score engine 8 assigns a risk score to the transaction 11 based on Bayesian weights stored in a local memory. Once the risk score is assigned, the risk score engine 8 can store transaction 11 in database 9 together with previous transactions that had been sent to the service provider 14 within a certain time window. The risk score may also be saved in memory 24. Periodically, the machine learning engine 7 will receive results 19 of backend evaluation and perform machine learning operations in order to adjust the Bayesian weights.

Risk score engine is configured to generate risk scores that are normalized such that a constant percentage of transactions can be maintained in each score band. This is performed by a normalization process that recalculates preliminary risk scores and maintains a constant challenge rate according to a "normalization table". The final normalized risk score is reflective of the percentage of user activities that are either more risky or less risky than the specific activity currently being analyzed. For example, a final risk score of 900 can mean that 0.25 percent of all user activities are more risky and the other 99.75 percent of all user activities are less risky than the specific activity currently being evaluated. The normalization process has the advantage of enabling service providers to plan ahead the number of cases that will be treated by its analyst team (not shown) and size it accordingly. Each analyst may be responsible for dealing with challenges issued in response to risky transactions.

In accordance with the techniques described herein, the processor 22 is also configured to periodically obtain the expected and actual risk scores 29 from the memory and determine first and second empirical cumulative distributions based on the respective expected and actual risk scores. The expected risk scores are the scores that are expected to be generated by the risk score engine 8 as a result of the normalization process. The actual scores are those scores that are actually generated by the risk score engine 8.

Also, in accordance with the techniques described herein, the processor 22 is further configured to compare the distributions by determining a Kolmogorov-Smirnov statistic. It should be appreciated that the comparison may be restricted to a certain risk area. For example, the comparison may be performed in an area with scores above a certain risk score. The processor 22 can also output an alarm based on the comparison and one or more policies. If the processor 22 outputs the alarm then the processor 22 can deal with the alarm by doing a local normalization that begins from the time the spike or deviation is identified. By looking only at data after the deviation, the new normalization can make sure that the scores will have similar distribution as the expected distribution. The fail over normalization will be used until the system detects that the regular normalization works well.

Figure 3:
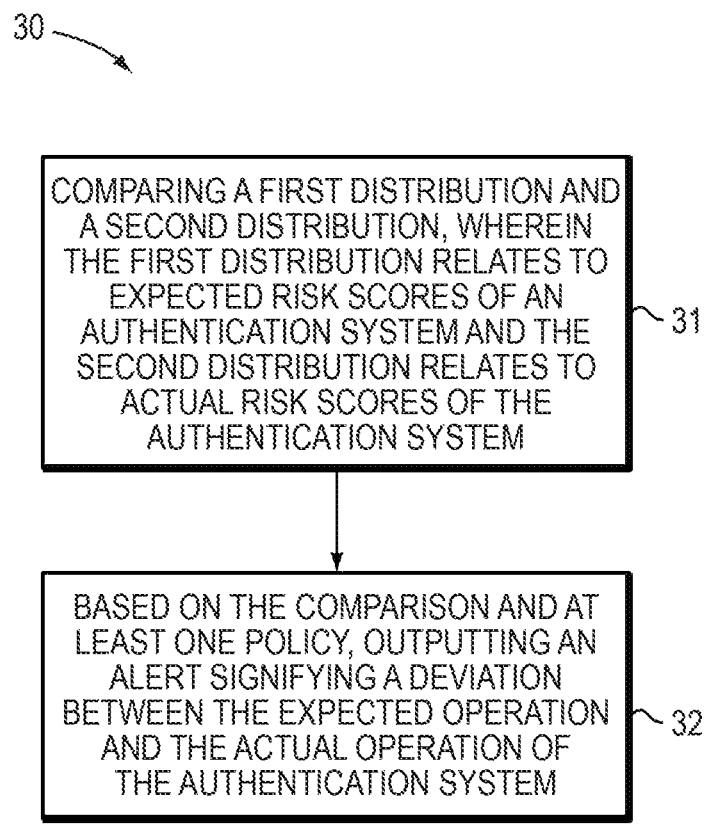
FIG. 3 is a flow chart illustrating and describing an exemplary method that incorporates aspects of the present invention.

FIG. 3 illustrates a flowchart of processing steps 30 for managing deviations between expected and normal operations of authentication systems. In the flow diagram, the processing steps are summarized in individual blocks. The processing steps may be performed in hardware, or as processor-executable instructions that may be executed by a processor. Furthermore, the processing steps may be performed in many different environments. For example, the processing steps may be performed in the environment of FIG. 1. The below description describes the performance of the processing steps in the environment of FIG. 1.

At step 31, a first distribution relating to expected risk scores of an authentication system is compared to a second distribution relating to actual risk scores of the authentication system. The first distribution comprises a first empirical cumulative distribution. The second distribution comprises a second empirical cumulative distribution. Here, the comparison is based on a Kolmogorov-Smirnov test by determining a Kolmogorov-Smirnov statistic or distance between the first and second empirical cumulative distributions. It should be understood that the comparison between the first distribution and the second distribution may be restricted to a range of interest. For example, the range of interest can be a risk area defined by risk scores that represent a high risk.

At step 32, an alert is outputted signifying a deviation between the expected operation and the actual operation of the authentication system based on the comparison and at least one policy. It should be understood that the at least one policy can comprise one or more policies that each have respective conditions that have to be met in order to output the alert. The at least one policy may comprise a first policy that requires a Kolmogorov-Smirnov statistic between the first and second distributions to be larger than a value that is based on Kolmogorov-Smirnov statistics associated with historical distributions in order to output the alert. The at least one policy may also comprise a second policy that requires a Kolmogorov-Smirnov statistic between the first and second distributions to be larger than a conversion function associated with a required assurance level of a goodness-of-fit test in order to output the alert. The at least one policy may further comprises a third policy that requires a sufficient amount of historical information in order to output the alert.

In use, it should be understood that the method 30 may perform the comparison by measuring the Kolmogorov-Smirnov statistic or distance between the first and second empirical cumulative distributions based on a modified version of the Kolmogorov-Smirnov (KS) test, as follows:

$$D_n = \frac{\sqrt{|\mathbb{C}|}}{100} * sup_x |\mathbb{C}'\downarrow_{ct}(x) - E\downarrow_{ct}(x)|$$

where,
D=Kolmogorov-Smirnov distance or Kolmogorov-Smirnov statistic
$\mathbb{C}$ =the group of scores
$F_n$=empirical cumulative distribution function
$\mathbb{C}'=F_n(\mathbb{C})$
$\mathbb{C}'\downarrow_{ct}$=reduction of the group of scores to scores higher then a cutoff or in a range of interest
E=expected cumulative distribution of the risk scores Further, as discussed above, the at least one policy may comprise a first policy that may require the measured Kolmogorov-Smirnov distance to be larger than a value that is based on Kolmogorov-Smirnov distances associated with historical distributions, as follows:

$$D(\mathbb{C}'_{\Delta t}) > mean(D(\mathbb{H}^i_{\Delta t})) + k*std(D(\mathbb{H}^i_{\Delta t}))$$

where,
D=Kolmogorov-Smirnov distance or Kolmogorov-Smirnov statistic
$\mathbb{C}$ =the group of scores
$F_n$=the empirical cumulative distribution function
$\mathbb{C}'=F_n(\mathbb{C})$
$\Delta t=|t_0-t|$ . . . (e.g., time since the beginning of day until t)
k=abnormal factor
$\mathbb{H}^i_{\Delta t, \Delta t'}$=historical empirical cumulative distributions
i=the index associated with the past weeks It should be understood that if the abnormal factor equals three then that first policy states that an alarm may be outputted when the currently measured Kolmogorov-Smirnov distance is larger than the average Kolmogorov-Smirnov distance and three standard deviations of Kolmogorov-Smirnov distance associated with historical empirical cumulative distributions.

Additionally, as described above, the second policy may require the currently measured Kolmogorov-Smirnov distance to be larger than a conversion function associated with a required assurance level of a goodness-of-fit test, as follows:

$$D(\mathbb{C}'_{\Delta t}) > c(\alpha)$$

where,
D=Kolmogorov-Smirnov distance or Kolmogorov-Smirnov statistic
$\mathbb{C}$ =the group of scores
$F_n$=empirical cumulative distribution function
$\mathbb{C}'=F_n(\mathbb{C})$
$\Delta t=|t_0-t|$ . . . (e.g., time since the beginning of day until t)
$c(\alpha)$=conversion function $$\alpha = \text{critical value} = 1 - \frac{assuranceLevel}{100}$$

It should be understood that the second policy may require use of a goodness-of-fit test in order to assess how certain the two distributions are similar (e.g., 99% certainty that they are the same). The assessment can be performed by an evaluation function using a critical value derived from an assurance Level parameter. The conversion between the assurance level and the critical value can be performed using a Brownian bridge algorithm.

It can be seen from the following values given by $c(\alpha)$ that if the Assurance Level is 99% then $c(\alpha)$ is 1.63.

| $\alpha$ | 0.10 | 0.05 | 0.025 | 0.01 | 0.005 | 0.001 |
|---|---|---|---|---|---|---|
| $c(\alpha)$ | 1.22 | 1.36 | 1.48 | 1.63 | 1.73 | 1.95 |

Further, as described above, the third policy may require a sufficient amount of historical information, as follows.

$$|\mathbb{H}| > mh * \frac{2}{3}$$

where,
$\mathbb{H}$ =historical empirical cumulative distributions
mh=minimum historical samples required It should be understood that if the minimum historical samples required equals six then it may be required to have at least four distance values from the last six historical weeks.

It should be further appreciated that in at least some embodiments if the conditions of the first, second and third policies are met then the alarm is outputted.

Figure 4:
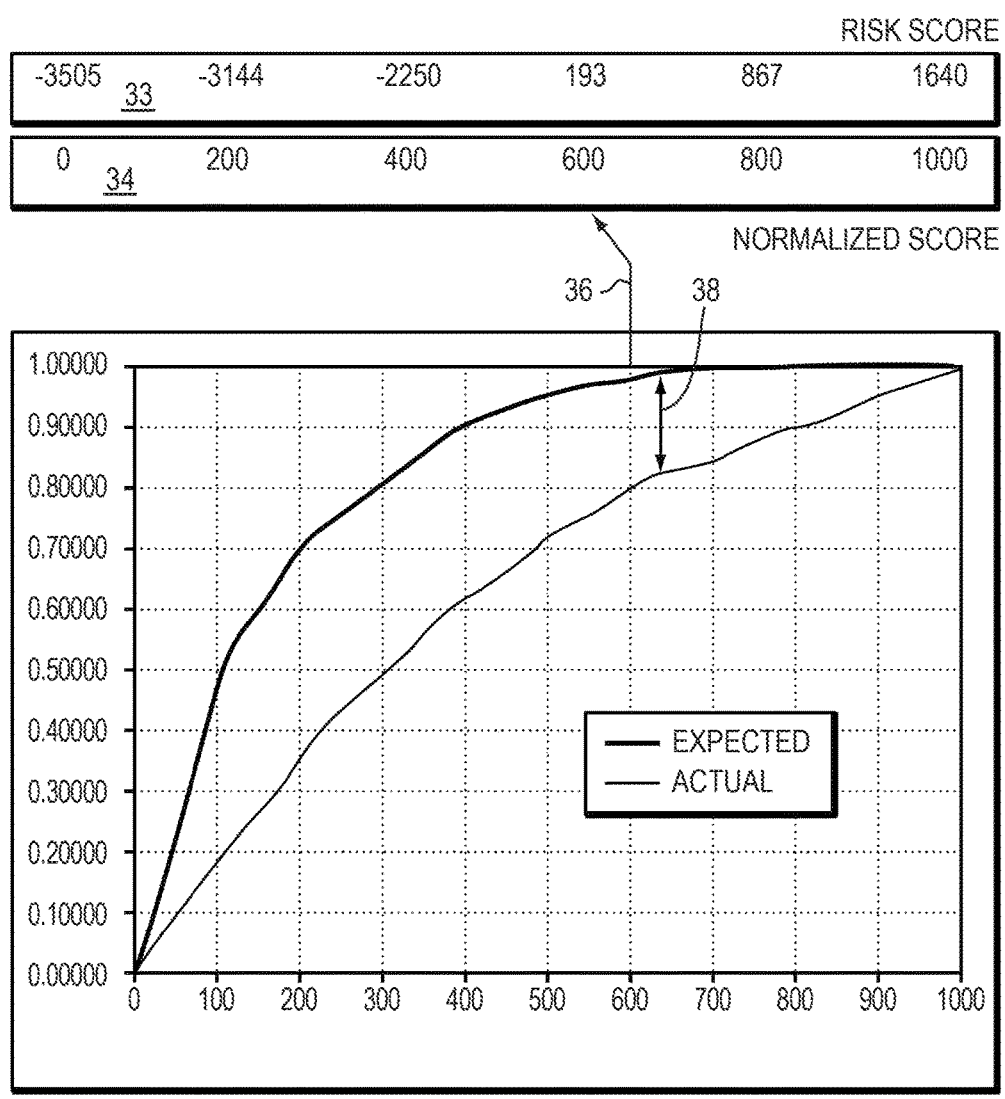
FIG. 4 is a schematic diagram illustrating at least a portion of the method of FIG. 3 in operation.

FIG. 4 illustrates an example of at least a portion of the method 30 in operation. The figure 40 represents a scale from 0-1000 of risk scores by which raw risk scores 33 are mapped to scaled risk scores 34. Each scaled risk score represents a percentile of risk scores. For example, a transaction having a scaled risk score of 100 is expected to represent a transaction having a risk score in the $50^{th}$ percentile of risk scores of all transactions. Additionally, a scaled risk score of 200 represents the $70^{th}$ percentile, 300 the $80^{th}$ percentile, 400 the $90^{th}$ percentile, 500 the $95^{th}$ percentile, 700 the $99^{th}$ percentile, and 900 the $99.7^{th}$ percentile. However, it can be seen that the actual risk scores generated differ to the expected risk scores. A transaction having a scaled risk score of 100 is in the $20^{th}$ percentile of risk scores of all transactions. Furthermore, a scaled risk score of 200 represents the $35^{th}$ percentile, 300 the $50^{th}$ percentile, 400 the $60^{th}$ percentile, 500 the $70^{th}$ percentile, 700 the $85^{th}$ percentile, and 900 the $95^{th}$ percentile.

Adaptive authentication engine 16 determines the first and second distributions and compares these distributions in a risk area between risk scores 600 and 1000. It should be noted from the figure that transactions having a risk score of 600 and above are considered the riskiest transactions 36. The comparison comprises determining a Kolmogorov-Smirnov statistic 38 in the risk area. It should also be understood from the foregoing that the alarm will be outputted based on the comparison and one or more policies.

The deviation between the expected and actual risk scores can occur for several reasons. It should be understood that the deviation may be as a result of a change in the model or new data that is sent by the client. For example, if a change occurs (new data/change in the model) there could be a situation where many transactions will get a high raw score which will then be mapped to a high risk score. Usually the raw scores would be mapped to the expected deviation of risk scores using the normalization but here the normalization may work on a mixed data that contain data before and after the change. The above deviation may also occur as a result of a true attack (e.g., many fraudulent events in a very short time). This is not a bad spike and the system may be acting correctly.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication engine 16. Some embodiments are directed to a system. Some embodiments are directed to a process. Also, some embodiments are directed to a computer program product which in turn enables computer logic.

In some arrangements, adaptive authentication engine 16 is implemented by a set of processors or other types of control/processing circuitry running software. In such arrangements, the software instructions can be delivered to adaptive authentication engine 16 in the form of a computer program product 80 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-implemented method, comprising:
   generating, by processing circuitry, a first distribution of risk scores expected to be produced by an authentication system in connection with a first set of one or more requests to access a computerized resource, wherein generating the first distribution comprises utilizing a normalization process to produce the expected risk scores by normalizing preliminary expected risk scores in connection with the first set of one or more requests to a scale of risk scores such that a pre-defined amount of the first set of one or more requests have expected risk scores in a range of risk scores at an end of the scale indicating high risk;
   generating, by processing circuitry, a second distribution relating to risk scores actually produced by the authentication system in connection with a second set of one or more requests to access the computerized resource, wherein generating the second distribution comprises utilizing a normalization process to produce the actual risk scores by normalizing preliminary actual risk scores in connection with the second set of one or more requests to the scale of risk scores;
   performing, by processing circuitry, a comparison between the first and the second distributions, wherein performing the comparison comprises utilizing the Kolmogorov-Smirnov distance to detect a deviation between the expected and the actual risk scores in the range of risk scores at the end of the scale indicating high risk;
   performing, by processing circuitry, a normalization process failover to a new normalization process after detection of the deviation, wherein the new normalization process is configured to reduce the deviation between the expected and the actual risk scores in the range of risk scores at the end of the scale indicating high risk, wherein the new normalization process is based on data related to a third set of one or more requests to access the computerized resource that are received after the detection of the deviation;
   receiving, by processing circuitry, a fourth set of one or more requests to access the computerized resource after the detection of the deviation,
   determining, by processing circuitry, actual risk scores in connection with the fourth set of one or more requests by normalizing preliminary actual risk scores in connection with the fourth set of one or more requests to the scale of risk scores in accordance with the new normalization process; and
   utilizing, by processing circuitry, the actual risk scores in connection with the fourth set of one or more requests to control access to the computerized resource.

2. The method as claimed in claim 1, wherein the first distribution comprises a first empirical cumulative distribution suitable for comparing with a distribution that relates to actual risk scores.

3. The method as claimed in claim 1, wherein the second distribution comprises a second empirical cumulative distribution suitable for comparing with a distribution that relates to expected risk scores.

4. The method as claimed in claim 1, wherein the initiation of the failover is based on the Kolmogorov-Smirnov distance between the respective distributions being larger than a value that is based on Kolmogorov-Smirnov distances associated with historical distributions.

5. The method as claimed in claim 1, wherein the initiation of the failover is based on the Kolmogorov-Smirnov distance between the respective distributions being larger than a conversion function associated with a required assurance level of a goodness-of-fit test.

6. The method as claimed in claim 1, wherein the initiation of the failover is based on there being a sufficient amount of historical information.

7. An apparatus, comprising:
memory; and
processing circuitry coupled to the memory, the memory storing instructions which, when executed by the processing circuitry, cause the processing circuitry to:
generate a first distribution of risk scores expected to be produced by an authentication system in connection with a first set of one or more requests to access a computerized resource, wherein generating the first distribution comprises utilizing a normalization process to produce the expected risk scores by normalizing preliminary expected risk scores in connection with the first set of one or more requests to a scale of risk scores such that a pre-defined amount of the first set of one or more requests have expected risk scores in a range of risk scores at an end of the scale indicating high risk;
generate a second distribution relating to risk scores actually produced by the authentication system in connection with a second set of one or more requests to access the computerized resource, wherein generating the second distribution comprises utilizing a normalization process to produce the actual risk scores by normalizing preliminary actual risk scores in connection with the second set of one or more requests to the scale of risk scores;
perform a comparison between the first and the second distributions, wherein performing the comparison comprises utilizing the Kolmogorov-Smirnov distance to detect a deviation between the expected and the actual risk scores in the range of risk scores at the end of the scale indicating high risk;
perform a normalization process failover to a new normalization process after detection of the deviation, wherein the new normalization process is configured to reduce the deviation between the expected and the actual risk scores in the range of risk scores at the end of the scale indicating high risk, wherein the new normalization process is based on data related to a third set of one or more requests to access the computerized resource that are received after the detection of the deviation;
receive a fourth set of one or more requests to access the computerized resource after the detection of the deviation;
determine actual risk scores in connection with the fourth set of one or more requests by normalizing preliminary actual risk scores in connection with the fourth set of one or more requests to the scale of risk scores in accordance with the new normalization process; and
utilize actual risk scores in connection with the fourth set of one or more requests to control access to the computerized resource.

8. The apparatus as claimed in claim 7, wherein the first distribution comprises a first empirical cumulative distribution suitable for comparing with a distribution that relates to actual risk scores.

9. The apparatus as claimed in claim 7, wherein the second distribution comprises a second empirical cumulative distribution suitable for comparing with a distribution that relates to expected risk scores.

10. The apparatus as claimed in claim 7, wherein the initiation of the failover is based on the Kolmogorov-Smirnov distance between the respective distributions being larger than a value that is based on Kolmogorov-Smirnov distances associated with historical distributions.

11. The apparatus as claimed in claim 7, wherein the initiation of the failover is based on the Kolmogorov-Smirnov distance between the respective distributions being larger than a conversion function associated with a required assurance level of a goodness-of-fit test.

12. The apparatus as claimed in claim 7, wherein the initiation of the failover is based on there being a sufficient amount of historical information.

13. A computer program product having a non-transitory computer-readable medium storing instructions, the instructions, when carried out by processing circuitry, causing the processing circuitry to perform a method of:
generating a first distribution of risk scores expected to be produced by an authentication system in connection with a first set of one or more requests to access a computerized resource, wherein generating the first distribution comprises utilizing a normalization process to produce the expected risk scores by normalizing preliminary expected risk scores in connection with the first set of one or more requests to a scale of risk scores such that a pre-defined amount of the first set of one or more requests have expected risk scores in a range of risk scores at an end of the scale indicating high risk;
generating a second distribution relating to risk scores actually produced by the authentication system in connection with a second set of one or more requests to access the computerized resource, wherein generating the second distribution comprises utilizing a normalization process to produce the actual risk scores by normalizing preliminary actual risk scores in connection with the second set of one or more requests to the scale of risk scores;
performing a comparison between the first and the second distributions, wherein performing the comparison comprises utilizing the Kolmogorov-Smirnov distance to detect a deviation between the expected and the actual risk scores in the range of risk scores at the end of the scale indicating high risk;
performing a normalization process failover to a new normalization process after detection of the deviation, wherein the new normalization process is configured to reduce the deviation between the expected and the actual risk scores in the range of risk scores at the end of the scale indicating high risk, wherein the new normalization process is based on data related to a third set of one or more requests to access the computerized resource that are received after the detection of the deviation;
receiving a fourth set of one or more requests to access the computerized resource after the detection of the deviation;
determining actual risk scores in connection with the fourth set of one or more requests by normalizing preliminary actual risk scores in connection with the fourth set of one or more requests to the scale of risk scores in accordance with the new normalization process; and utilizing the actual risk scores in connection with the fourth set of one or more requests to control access to the computerized resource.

14. The computer program product as claimed in claim 13, wherein the first distribution comprises a first empirical cumulative distribution suitable for comparing with a distribution that relates to actual risk scores.

15. The computer program product as claimed in claim 13, wherein the second distribution comprises a second empirical cumulative distribution suitable for comparing with a distribution that relates to expected risk scores.

16. The computer program product as claimed in claim 13, wherein the initiation of the failover is based on the Kolmogorov-Smirnov distance between the respective distributions being larger than a value that is based on Kolmogorov-Smirnov distances associated with historical distributions.

17. The computer program product as claimed in claim 13, wherein the initiation of the failover is based on the Kolmogorov-Smirnov distance between the respective distributions being larger than a conversion function associated with a required assurance level of a goodness-of-fit test.

18. The computer program product as claimed in claim 13, wherein the initiation of the failover is based on there being a sufficient amount of historical information.

* * * * *